(12) United States Patent
Luo (10) Patent No.: US 11,504,858 B2
(45) Date of Patent: Nov. 22, 2022

(54) ROLE SWITCHING OF ROBOTS WITH SIMILAR APPEARANCE

(71) Applicant: CLOUDMINDS (SHENZHEN) ROBOTICS SYSTEMS CO., LTD., Shenzhen (CN)

(72) Inventor: Lei Luo, Shenzhen (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 447 days.

(21) Appl. No.: 16/747,290

(22) Filed: Jan. 20, 2020

(65) Prior Publication Data

US 2020/0147809 A1  May 14, 2020

Related U.S. Application Data

(63) Continuation of application No. PCT/CN2017/092821, filed on Jul. 13, 2017.

(51) Int. Cl.
*G10L 15/22* (2006.01)
*B25J 13/00* (2006.01)
*G10L 15/18* (2013.01)
*G10L 15/08* (2006.01)

(52) U.S. Cl.
CPC .......... *B25J 13/003* (2013.01); *G10L 15/1822* (2013.01); *G10L 15/22* (2013.01); *G10L 2015/088* (2013.01); *G10L 2015/223* (2013.01)

(58) Field of Classification Search
CPC ...... G10L 15/22; G10L 15/28; B25J 11/0005; B25J 11/008; B25J 13/003

USPC ............. 704/270, 270.1, 275; 901/1, 6, 8; 700/245, 246, 248

See application file for complete search history.

(56) References Cited

U.S. PATENT DOCUMENTS

| 6,523,629 | B1* | 2/2003 | Buttz | B60D 1/28 |
| | | | | 901/1 |
| 8,483,930 | B2* | 7/2013 | Kawaguchi | B25J 13/00 |
| | | | | 901/17 |
| 10,538,932 | B2* | 1/2020 | Goldenberg | B25J 11/0085 |
| 2006/0079997 | A1* | 4/2006 | McLurkin | G06N 3/008 |
| | | | | 700/245 |
| 2009/0082879 | A1* | 3/2009 | Dooley | B25J 9/0084 |
| | | | | 700/3 |
| 2012/0059514 | A1* | 3/2012 | Suh | B25J 9/1658 |
| | | | | 901/50 |

(Continued)

FOREIGN PATENT DOCUMENTS

| CN | 104238552 A | 12/2014 |
| CN | 105259814 A | 1/2016 |

(Continued)

OTHER PUBLICATIONS

International Search Report dated Apr. 11, 2018: PCT/CN2017/092821.

*Primary Examiner* — Martin Lerner (57) ABSTRACT

A role switching method of robots with similar appearance includes: at a robot, the robot being capable of communicating with other robots within a predetermined range: identifying other robots having the same appearance as the robot itself within the predetermined range; and performing role exchange with the other robots having the same appearance as the robot itself within the predetermined range.

12 Claims, 5 Drawing Sheets

Identify other robots having the same appearance as the robot itself within the predetermined range — 101

Perform role exchange with the other robots having the same appearance as the robot itself within the predetermined range — 102

(56) References Cited

U.S. PATENT DOCUMENTS

| | | | | |
|---|---|---|---|---|
| 2016/0121487 A1* | 5/2016 | Mohan | ................... | B25J 13/085 |
| | | | | 700/250 |
| 2017/0046955 A1 | 2/2017 | Shen | | |
| 2017/0278414 A1* | 9/2017 | Kadosawa | ............... | G09B 5/04 |
| 2017/0285628 A1* | 10/2017 | Erhart | .................... | B25J 11/008 |
| 2017/0368689 A1* | 12/2017 | Tomida | ................. | B25J 9/0084 |
| 2018/0200884 A1* | 7/2018 | Perets | ..................... | B25J 9/163 |

FOREIGN PATENT DOCUMENTS

| | | | | |
|---|---|---|---|---|
| CN | 105294726 A | | 1/2017 | |
| DE | 20-2005-007-654 | * | 1/2005 | ............... B25J 9/16 |

\* cited by examiner

Perform role exchange with the other robots having the same appearance as the robot itself within the predetermined range at an interval of a predetermined time period according to working task types or characters of the other robots ——1029

FIG. 6

Perform role exchange with the other robots having the same appearance as the robot itself within the predetermined range if it is identified that the robot is abnormal ——1030

ROLE SWITCHING OF ROBOTS WITH SIMILAR APPEARANCE

CROSS-REFERENCE TO RELATED APPLICATIONS

This application is a continuation of International Application No. PCT/CN2017/1092821 with an international filing date of Jul. 13, 2017, the entire contents of which are incorporated herein by reference.

TECHNICAL FIELD

Embodiments of the present application relate to the technical field of artificial intelligence, and in particular, relate to a role switching of robots with similar appearance.

BACKGROUND

With the development of artificial intelligence, robots bring more convenience to people's production and life. At present, robots are more and more widely used, and take an important role in household and commercial fields. For convenience of process and manufacture, and reduction of design cost, robots of the same model or in several generations may have the same appearance.

In studies of the related art, the inventors have identified that the related art has at least the following problem: The robots having the same appearance are responsible for the same or similar tasks in production lines or assembly lines. However, in families or other application scenarios, the robots each have their individual roles, and are generally responsible for different tasks, for example, receiving guests or visitors, shows, and cleanings. In some application scenarios, it is expected that role exchange may be performed between the robots. For example, a robot for receiving guests or visitors needs to exchange role with a robot for shows. If role exchange is performed between the robots having the same appearance, requirements in some application scenarios may be accommodated, and thus user experience is better improved.

SUMMARY

An embodiment of the present application provides a robot role switching method. The method includes: at a robot, the robot being capable of communicating with other robots within a predetermined range: identifying other robots having the same appearance as the robot itself within the predetermined range; and performing role exchange with the other robots having the same appearance as the robot itself within the predetermined range.

Another embodiment of the present application provides a robot. The robot includes: at least one processor; and a memory communicably connected to the at least one processor; wherein the memory stores instructions executable by the at least one processor, wherein, the instructions, when being executed by the at least one processor, cause the at least one processor to perform the steps of: identifying other robots having the same appearance as the robot itself within the predetermined range; and performing role exchange with the other robots having the same appearance as the robot itself within the predetermined range.

Still another embodiment of the present application provides a non-volatile computer-readable storage medium. The computer-readable storage medium stores computer-executable instructions, which, when being executed by a robot, cause the robot to perform the steps of: identifying other robots having the same appearance as the robot itself within the predetermined range; and performing role exchange with the other robots having the same appearance as the robot itself within the predetermined range.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions and advantages of the embodiments of the present application clearer, the technical solutions according to the embodiments of the present application are clearly and thoroughly described with reference to the accompanying drawings of the embodiments of the present application. The described embodiments are merely exemplary ones, but are not all the embodiments of the present application. Based on the embodiments of the present application, all other embodiments derived by persons of ordinary skill in the art without any creative efforts shall fall within the protection scope of the present application.

Figure 1:
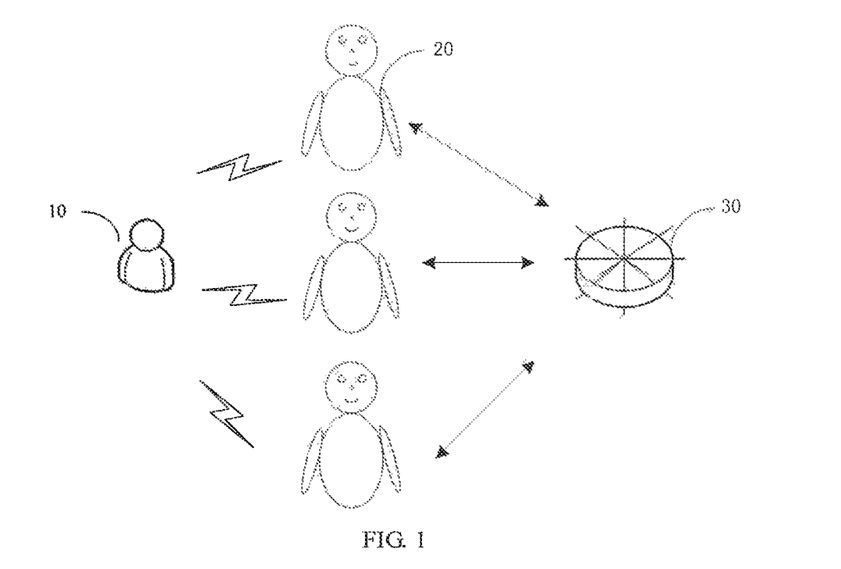
FIG. 1 is a schematic diagram of an application scenario of a role switching method and apparatus according to the present application.

A robot role switching method and apparatus according to the embodiments of the present application are applicable to an application scenario as illustrated in FIG. 1. The application scenario involves a user 10 and a plurality of robots 20. The plurality of robots 20 may communicate with each other within a predetermined range. The predetermined range may be the same network, for example, a local area network deployed at a home or in a company, or a specific network or the like (as illustrated in FIG. 1, the plurality of robots 20 communicate with each other over a network 30). The predetermined range further includes the plurality of robots 20 may communicate with each other by near-field communication, for example, an electronic tag or the like, within a specific distance (for example, within a house). The user 10 may set the plurality of robots 20, issue a command, or make a conversation with the robots 20. The user 10 may be an owner or user of the robot 20.

Each robot has a corresponding wake-up word for waking up the robot from a sleep state or responding to a call of the user (generally one wake-up word is defined, and nevertheless, a plurality of wake-up words may also be defined). The wake-up word may be a name of the robot, an identification code or any other random word, and the wake-up word may be set by the user or may be provided before delivery from factory.

The embodiments of the present application are particularly applicable to a scenario where the same user owns a plurality of robots having the same appearance. Since each robot has its own role and is generally responsible for a designated task, to prevent the robot whose work load is great from failure within a short time period, role exchange may be performed between two robots having the same appearance. To differentiate the robots having the same appearance, different characters may also be set for the robots, and the user 10 may differentiate the robots according to the characters of the robots.

It should be noted that although FIG. 1 only illustrates one user 10, and three robots 20, a person skilled in the art may understand that in practice, the applicant scenario may include more users 10 and more robots 20.

Figure 2:
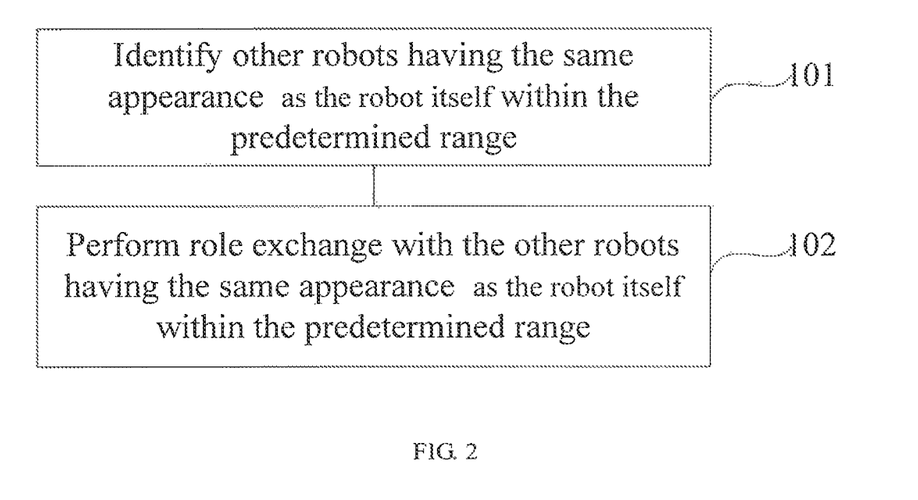
FIG. 2 is a schematic flowchart of a role switching method according to an embodiment of the present application.

An embodiment of the present application provides a robot role switching method. The method may be performed by any robot 20 as illustrated in FIG. 1. As illustrated in FIG. 2, the method includes the following steps:

Step 101: Other robots having the same appearance as the robot itself within the predetermined range are identified.

Generally, the brand and model of the robots having the same appearance are the same, and a robot may identify whether the other robots are robots having the same appearance by identifying the brand and model. If the robots are robots having the same brand and appearance but different models, the robot companies may set a code or a style number to represent the robots having the same appearance. In this case, the robot may identify, according to the number or the style number, whether the robots have the same appearance as the robot itself. In practice, for example, if a robot is newly added to a family, the new robot may broadcast its brand, model, code, style number or the like information to the other robots. If the other robots find that the brand of the new robot is the same as theirs, and any one or more of the model, code and style number of the robot are the same as theirs, it may be identified that the new robot has the same appearance.

Step 102: Role exchange is performed with the other robots having the same appearance as the robot itself within the predetermined range.

The role exchange includes: exchange of wake-up words, exchange of characters, and exchange of working tasks.

According to the embodiment of the present application, role exchange may be implemented between the robot and the other robots having the same appearance as the robot itself within the predetermined range, such that some application scenarios are accommodated, and user experience is better improved.

Figure 3:
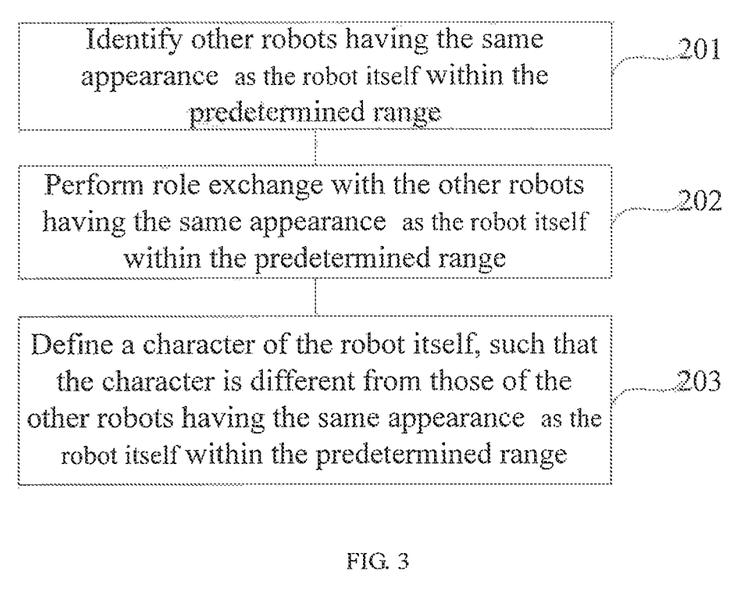
FIG. 3 is a schematic flowchart of a role switching method according to an embodiment of the present application.

Optionally, for the convenience of differentiating the robots having the same appearance by the user, in other embodiments of the method, as illustrated in FIG. 3, in addition to step 201 and step 202 (for the details of step 201 and step 202, reference may be made to step 101 and step 102), the method further includes the following steps:

Step 203: A character of the robot itself is defined, such that the character is different from those of the other robots having the same appearance as the robot itself within the predetermined range.

After the robots having the same appearance as the robot itself are identified, two (or more) robots having the same appearance may enable a synchronization mechanism to synchronize setting and configuration information, wherein the setting and configuration information includes wake-up words and characters. In this way, each of the robots having the same appearance may know the setting and configuration information of another. The robots having the same appearance may be defined to different characters. For example, one robot may be set to be active, talkative and loud in voice, and another robot may be set to be mild, gentle, inactive or less talkative, and soft in voice. The characters may be chosen from a plurality of predetermined characters, and the plurality of characters may be predefined before delivery from factory, or may be loaded from a cloud end after delivery from factory. Nevertheless, the user may also define the character of the robot according to his or her actual needs. If the user does not like the current character of the robot, the robot may switch between different characters according to a command for the user.

According to the embodiment of the present application, different characters are defined for the robots having the same appearance, such that the user differentiates the robots according to the characters of the robots. In this way, it is convenient for the user to differentiate the robots, and thus user experience is bettered.

Figure 4:
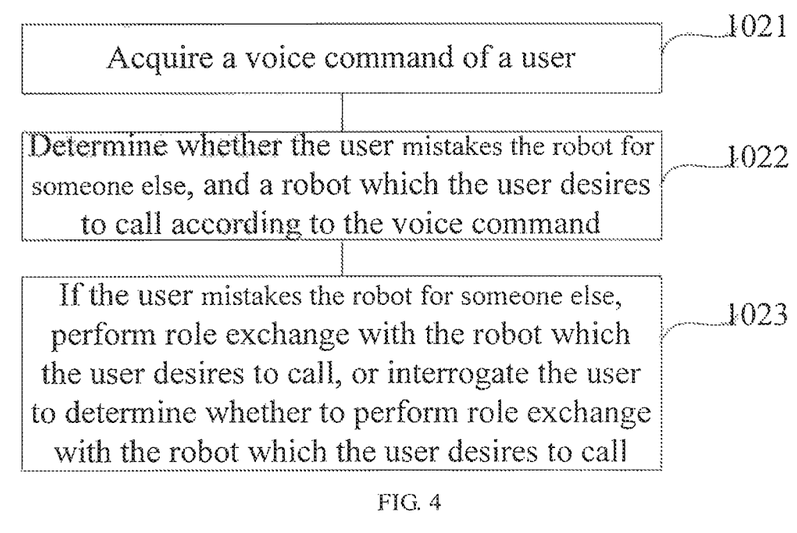
FIG. 4 is a schematic flowchart of role exchange with other robots having the same appearance as the robot itself within a predetermined range in the role switching method according to an embodiment of the present application.

Specifically, to further enhance user experience, in some embodiments of the method, as illustrated in FIG. 4, performing role exchange with the other robots having the same appearance as the robot itself within the predetermined range includes the following steps:

Step 1021: A voice command of a user is acquired.

The voice command of the user is generally in the form of a wake-up word plus command content, for example, "Mike (wake-up word), what is the weather like today (command content)?"

Step 1022: Whether the user mistakes the robot for someone else, and a robot which the user desires to call are determined according to the voice command.

After the robots having the same appearance within the predetermined range are identified, two (or more) robots having the same appearance may synchronize with each other real-time position information thereof, and add the wake-up words of the other robots having the same appearance as the robot itself within the predetermined range to a predetermined wake-up word library. The wake-up word library may be configured before delivery from factor or may be configured by the user.

First, a wake-up word in the voice command is parsed out according to the voice command of the user. If the wake-up word in the wake-up word is different from the wake-up word of the robot itself but is the same as a wake-up word in the wake-up word library, it indicates that the user desires to call another robot having the same appearance instead of the robot itself. In this case, the real-time position information of the robot (that is, the robot which the user desires to call) corresponding to the wake-up word in the voice command is acquired, and whether the real-time position information is within a predetermined position range is identified. The predetermined position range may be a specific range in the vicinity of the robot. If the predetermined position information is not within the predetermined position range, it indicates that the robot which the user desires to call is not present in the vicinity, and it may thus be determined that the user mistakes the robot for someone else itself. The robot which the user desires to call may be determined according to the wake-up word in the voice command.

Step 1023: if the user mistakes the robot for someone else, role exchange is performed with the robot which the user desires to call, or the user is interrogated to determine whether to perform role exchange with the robot which the user desires to call.

If it is identified that the user mistakes the robot for someone else itself, the robot may communicate with the other robot to perform role exchange therebetween. Alternatively, if the user mistakes the robot for someone else itself, the robot may interrogate the user whether role exchange needs to be performed between the robot and the someone else, and perform role exchange with the someone else upon receipt of an acknowledgement from the user. If the user does not need role exchange, role exchange does not need to be performed. Further, before role exchange, whether role exchange affects the current tasks of the two robots may be judged. If the tasks may not be affected, role exchange may be performed between the two robots. If the tasks may be affected, role exchange may not be performed between the two robots. In this case, the position of the robot which the user desires to call may be notified to the user according to the real-time position information. For example, in the case of twin robots Tony and William, the user mistakes Tony for William. In this case, when Tony hears that the user calls him William, Tony may automatically perform role exchange with William, and thus the current task of the new William is to respond to the call of the user, and the current task of the new Tony becomes switching to the task of the former William.

The embodiment of the present application is applicable to a scenario where the user makes confusion between the robots. Although different characters are defined for the robots having the same appearance, sometimes it is still inevitable to make a mistake in differentiating these robots. In the scenario of mistaking one robot for another, the robot which is called by mistake exchanges the role with the robot which the user desires to call, or the user is interrogated to determine whether role exchange is needed. In this way, a solution is provided for the scenario where the user mistaking one robot for another, and thus user experience is further enhanced.

Figure 5:
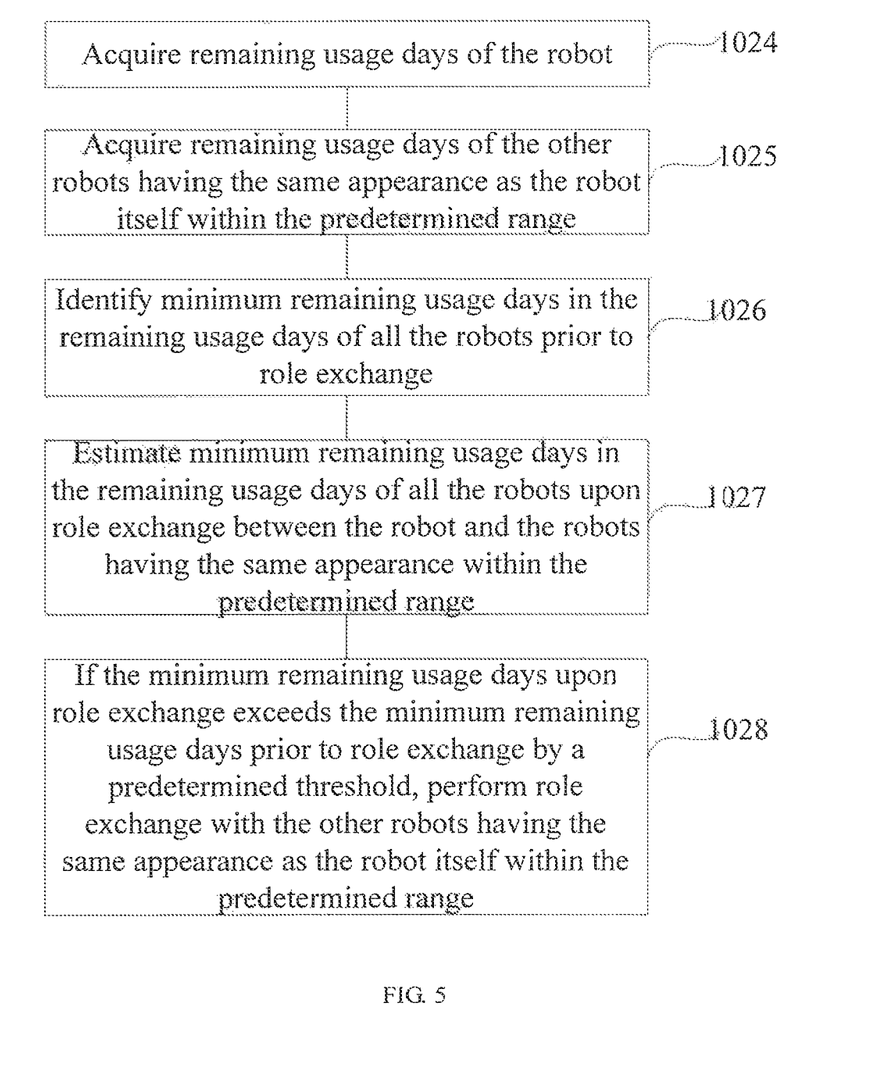
FIG. 5 is a schematic flowchart of role exchange with other robots having the same appearance as the robot itself within a predetermined range in the role switching method according to an embodiment of the present application.

Due to different character configurations or task attributes, for example, one robot is active and lively, and another robot is quiet and less active, or one robot is responsible for doing housework, and another robot is responsible for receiving and welcoming visitors or guests, it is inevitable that the robot doing more actions is mechanically worn more quickly. For a balance of joint wear of two or more robots having the same appearance, optionally, as illustrated in FIG. 5, in some embodiments of the method, performing role exchange with the other robots having the same appearance as the robot itself within the predetermined range includes the following steps:

Step 1024: Remaining usage days of the robot are acquired.

Specifically, acquiring the remaining usage days of the robot includes:

acquiring mechanical wear of each joint;

The mechanical wear of the joint may be estimated according to the number of bending times of the joint or the total number of turns of the servo, or the usage time of the joint or the like.

estimating a remaining usage degree of the joint according to the mechanical wear;

estimating a daily wear amount of the joint according to a working task average value;

estimating the remaining usage days of the joint according to the remaining usage degree and the daily wear amount of the joint;

wherein the remaining usage days is acquired by dividing the remaining usage degree of the joint by the daily wear amount; and taking minimum remaining usage days in the remaining usage days of all the joints as the remaining usage days of the robot.

Step 1025: Remaining usage days of the other robots having the same appearance as the robot itself within the predetermined range is acquired.

Step 1026: Minimum remaining usage days in the remaining usage days of all the robots prior to role exchange is identified.

Upon acquiring the remaining usage days, each robot may broadcast the remaining usage days to the other robots having the same appearance, and receive the remaining usage days of the other robots sent by the other robots having the same appearance. One robot may find the minimum remaining usage days in all the remaining usage days.

Step 1027: Minimum remaining usage days in the remaining usage days of all the robots is estimated upon role exchange between the robot and the robots having the same appearance within the predetermined range.

Step 1028: If the minimum remaining usage days upon role exchange exceeds the minimum remaining usage days prior to role exchange by a predetermined threshold, role exchange is performed with the other robots having the same appearance as the robot itself within the predetermined range.

If there are two robots having the same appearance, then one robot may identify whether the minimum remaining usage days upon role exchange exceeds a predetermined threshold (the predetermined threshold may be, for example, two weeks, one month or the like) relative to the minimum days prior to role exchange. If the minimum remaining usage days upon role exchange exceeds the predetermined threshold, that is, if usage terms of the two robots prior to role exchange is superior over usage terms thereof prior to role exchange, role exchange is performed. If there are more than two robots having the same appearance, then one robot may list a plurality of solutions of role exchange between a plurality of robots, then choose solutions where the minimum remaining usage day's upon role exchange exceeds a predetermined threshold relative to the minimum remaining usage day's prior to role exchange, choose a solution where the minimum remaining usage days is the maximum in these solutions, and finally perform role exchange according to the solution where the minimum remaining usage days is the maximum. If in all the role exchange solutions upon role exchange, the minimum remaining usage days does not exceed the minimum remaining usage days prior to role exchange by the predetermined threshold, role exchange is not performed.

According to the embodiment of the present application, role exchange is performed according to the remaining usage days of each robot, such that the usage term of each robot upon role exchange is superior over the usage term thereof prior to role exchange, to prevent the scenario where the robot which is more active is more apt to fail over the less-active robot. In this way, the joint wear of two or more robots is more balanced.

It should be noted that steps 1024, 1025, 1026, 1027 and 1028 are not necessarily performed by each robot. However, steps 1025, 1026 and 1027 may be only performed by one robot or a plurality of robots. For example, each robot may broadcast its own operating state to the other robots, and an idlest robot performs the steps 1025, 1026 and 1027 and then shares a result to the other robots over the network.

Figure 6:
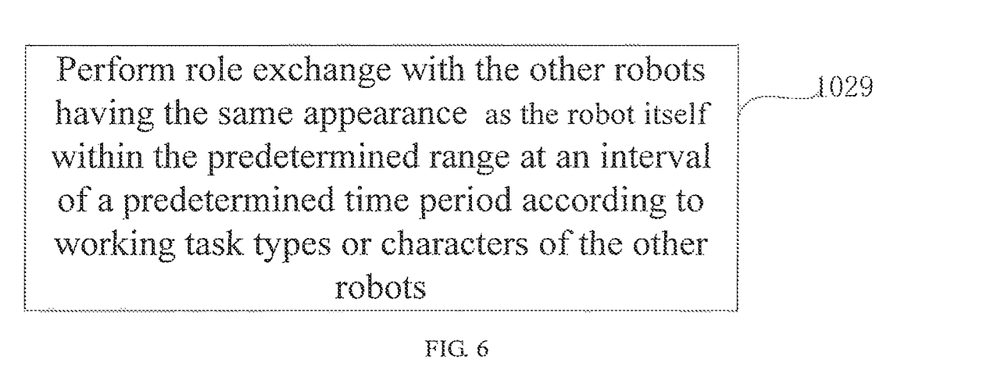
FIG. 6 is a schematic flowchart of role exchange with other robots having the same appearance as the robot itself within a predetermined range in the role switching method according to an embodiment of the present application.

Optionally, as illustrated in FIG. 6, in other embodiments of the method, role exchange may be performed only according to a time interval. That is, performing role exchange with the other robots having the same appearance as the robot itself within the predetermined range includes the following step:

Step 1029: Role exchange is performed with the other robots having the same appearance as the robot itself within the predetermined range at an interval of a predetermined time period according to working task types or characters of the other robots.

The predetermined time period may be three months, six months or the like. For example, at an interval of six months, role exchange is performed between a lively and active robot and a quiet and less-active robot and role exchange is performed between a robot responsible for tasks causing more joint wear and a robot responsible for tasks causing less joint wear.

Figure 7:
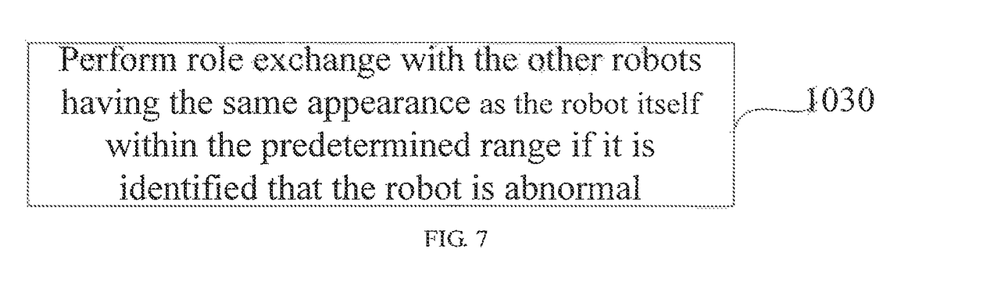
FIG. 7 is a schematic flowchart of role exchange with other robots having the same appearance as the robot itself within a predetermined range in the role switching method according to an embodiment of the present application.

Optionally, as illustrated in FIG. 7, in other embodiments of the method, performing role exchange with the other robots having the same appearance as the robot itself within the predetermined range includes the following step:

Step 1030: Role exchange is performed with the other robots having the same appearance as the robot itself within the predetermined range if it is identified that the robot is abnormal.

If the robot identifies that the robot is abnormal, for example, when the robot is about to crash down due to over-temperature or fail to continuously operate due to other causes, to continue the current task, the robot may perform role exchange with the other robots having the same appearance as the robot itself within the predetermined range. Further, to ensure that a task having a higher priority is performed preferentially, prior to role exchange with the other robots, the robot may determine the priorities of the robots having the same appearance as the robot itself. The robot may choose a robot having a priority lower than that of the robot itself and perform role exchange with the chosen robot. In this way, continuity of the tasks having higher priorities may be ensured. For example, the priorities of the tasks may be classified to 1, 2, 3, 4 and 5, wherein 1 indicates the highest priority. Assuming that a robot 1 which may immediately fail to operate is performing a task having the priority 2, and another robot 2 having the same appearance is performing a task having the priority 2, then the robot 1 communicates with the robot 2, and detects that the task priority satisfies the requirement of role exchange. In this case, role exchange may be performed between the robot 1 and the robot 2. The robot 2 may reach the position of the robot 1 according to the synchronized real-time position information.

Figure 8:
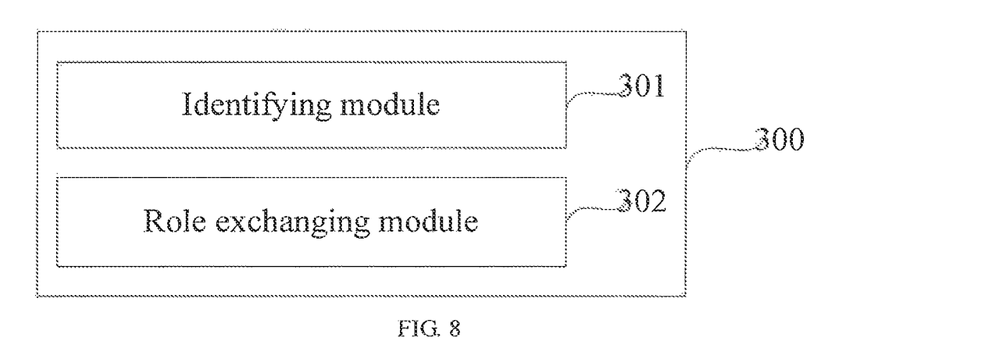
FIG. 8 is a schematic structural diagram of a role switching apparatus according to an embodiment of the present application.

Correspondingly, an embodiment of the present application further provides a robot role switching apparatus 300. The apparatus is arranged in any robot as illustrated in FIG. 1. As illustrated in FIG. 8, the apparatus 300 includes:

an identifying module 301, configured to identify other robots having the same appearance as the robot itself within the predetermined range; and a role exchanging module 302, configured to perform role exchange with the other robots having the same appearance as the robot itself within the predetermined range.

According to the embodiment of the present application, role exchange may be implemented between the robot and the other robots having the same appearance as the robot itself within the predetermined range, such that some application scenarios are accommodated, and user experience is better improved.

Figure 9:
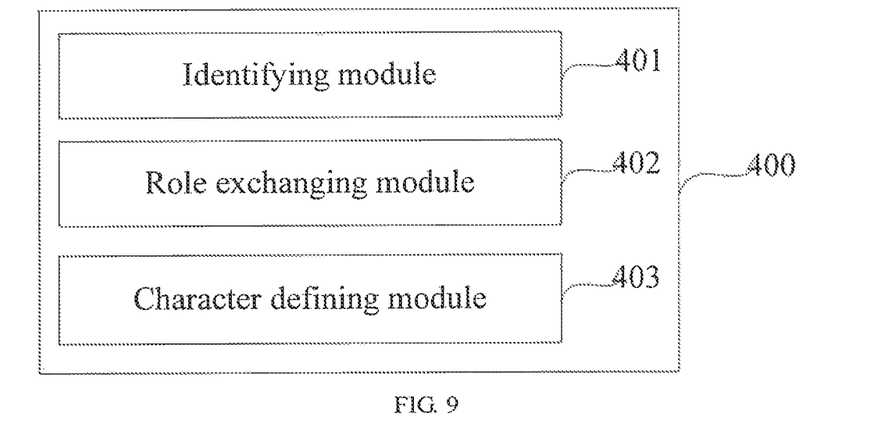
FIG. 9 is a schematic structural diagram of a role switching apparatus according to an embodiment of the present application.

Optionally, as illustrated in FIG. 9, in other embodiments of the apparatus, in addition to the identifying module 401 and the role exchanging module 402, the apparatus 400 further includes:

a character defining module 403, configured to define a character of the robot itself, such that the character is different from those of the other robots having the same appearance as the robot itself within the predetermined range.

Figure 10:
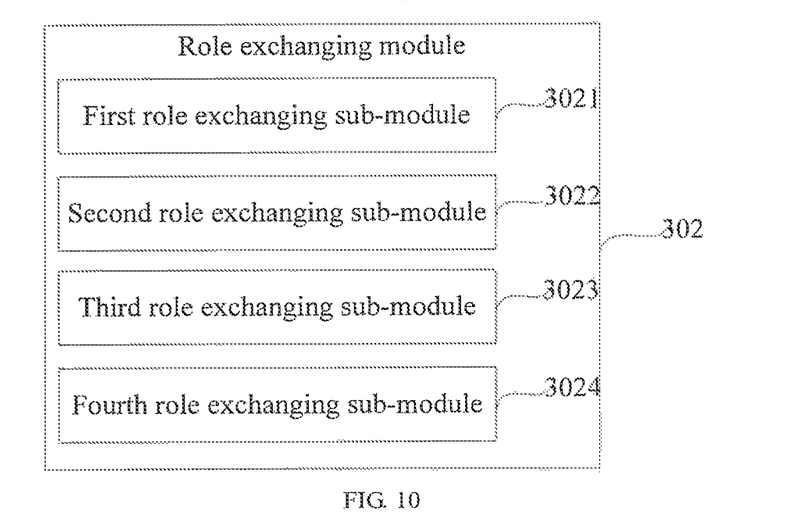
FIG. 10 is a schematic structural diagram of a role exchanging module according to an embodiment of the present application.

Optionally, as illustrated in FIG. 10, in some embodiments of the apparatus, the role exchanging module 302 includes a first role exchanging sub-module 3021, configured to:

acquire a voice command of a user;

determine, according to the voice command, whether the user mistakes the robot for someone else, and a robot which the user desires to call;

if the user mistakes the robot for someone else, perform role exchange with the robot which the user desires to call, or interrogate the user whether to perform role exchange with the robot which the user desires to call.

Optionally, in other embodiments of the apparatus, the apparatus further includes:

a wake-up word adding module, configured to add wake-up words of the other robots having the same appearance as the robot itself within the predetermined range into a predetermined wake-up word library; and a sharing module, configured to share real-time position information with the other robots having the same appearance as the robot itself within the predetermined range;

wherein the first role exchanging sub-module 3021 is further configured to:

parse out a wake-up word in the voice command according to the voice command of the user;

if the wake-up word in the voice command is different from a wake-up word of the robot but is the same as a wake-up word in the wake-up word library, acquire real-time position information of a robot corresponding to the wake-up word in the voice command, identify whether the real-time position information is within a predetermined position range, and determine that the user mistakes the robot for someone else if the real-time position information is not within the predetermined position range; and determine, according to the wake-up word in the voice command, the robot which the user desires to call.

Optionally, as illustrated in FIG. 10, in some embodiments of the apparatus, the role exchanging module 302 includes a second role exchanging sub-module 3022, configured to:

acquire remaining usage days of the robot;

acquire remaining usage days of the other robots having the same appearance as the robot itself within the predetermined range;

identify minimum remaining usage days in the remaining usage days of all the robots prior to role exchange;

estimate minimum remaining usage days in the remaining usage days of all the robots upon role exchange between the robot and the robots having the same appearance within the predetermined range; and if the minimum remaining usage days upon role exchange exceeds the minimum remaining usage days prior to role exchange by a predetermined threshold, perform role exchange with the other robots having the same appearance as the robot itself within the predetermined range.

Optionally, in other embodiments of the apparatus, the second role exchanging sub-module 3022 is further configured to:

acquire mechanical wear of each joint;

estimate a remaining usage degree of the joint according to the mechanical wear;

estimate a daily wear amount of the joint according to a working task;

estimate the remaining usage days of the joint according to the remaining usage degree and the daily wear amount of the joint;

take minimum remaining usage days in the remaining usage days of all the joints as the remaining usage days of the robot.

Optionally, as illustrated in FIG. 10, in some embodiments of the apparatus, the role exchanging module 302 includes a third role exchanging sub-module 3023, configured to:

perform role exchange with the other robots having the same appearance as the robot itself within the predetermined range at an interval of a predetermined time period according to working task types or characters of the other robots.

Optionally, as illustrated in FIG. 10, in some embodiments of the apparatus, the role exchanging module 302 includes a fourth role exchanging sub-module 3024, configured to:

perform role exchange with the other robots having the same appearance as the robot itself within the predetermined range if it is identified that the robot is abnormal.

Optionally, in other embodiments of the apparatus, the fourth role exchanging sub-module is further configured to:

perform role exchange with a robot whose working priority is lower that the robot itself in the other robots having the same appearance as the robot itself within the predetermined range.

Optionally, in some embodiments of the apparatus, the role exchange includes: exchange of wake-up words, exchange of characters, and exchange of working tasks.

Figure 11:
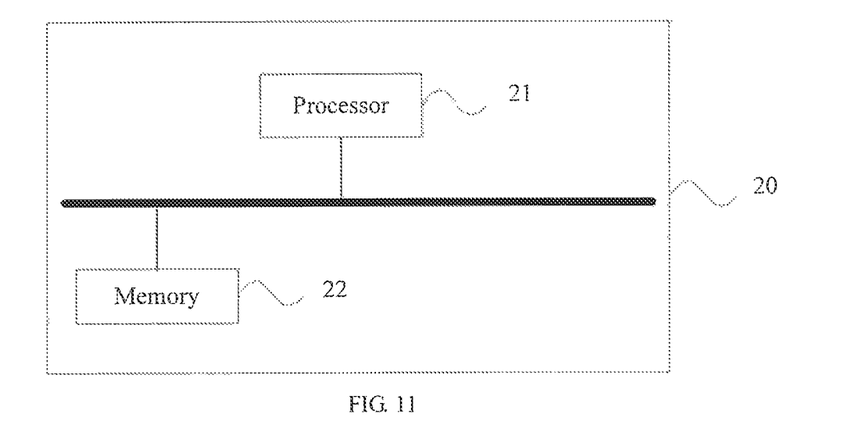
FIG. 11 is a schematic hardware structural diagram of a robot in the role switching method according to an embodiment of the present application.

FIG. 11 is a schematic hardware structural diagram of a robot 20 in the robot role switching method according to an embodiment of the present application.

As illustrated in FIG. 11, the robot 20 includes: at least one processor 21 and a memory 22, and FIG. 11 uses one processor as an example.

The at least one processor 21 and the memory 22 may be connected via a bus or in another manner, and FIG. 11 uses the bus as an example.

The memory 22, as a non-volatile computer readable storage medium, may be configured to store non-volatile software programs, non-volatile computer executable programs and modules, for example, the program instructions/modules corresponding to the role switching method in the embodiments of the present application (for example, the identifying module 301 and the character defining module 302 as illustrated in FIG. 8). The non-volatile software programs, instructions and modules stored in the memory 22, when being executed, cause the processor 21 to perform various function applications and data processing of a server, that is, performing the role switching method according to the above method embodiments.

The memory 22 may include a program memory area and data memory area, wherein the program memory area may store operating systems and application programs needed by at least one function; and the data memory area may store data created according to the usage of the role switching apparatus. In addition, the memory 22 may include a high speed random access memory, or include a non-volatile memory, for example, at least one disk storage device, a flash memory device, or another non-volatile solid storage device. In some embodiments, the memory 22 optionally includes memories remotely configured relative to the processor 21. These memories may be connected to the role switching apparatus over a network. Examples of the above network include, but not limited to, the Internet, Intranet, local area network, mobile communication network and a combination thereof.

One or more modules are stored in the memory 22, and when being executed by the at least one processor 21, perform the role switching method according to any of the above method embodiments, for example, performing steps 101 to 102 in the method as illustrated in FIG. 2, steps 201 to 203 in the method as illustrated in FIG. 3, steps 1021 to 1203 in the method as illustrated in FIG. 4, steps 1024 to 1028 in the method as illustrated in FIG. 5, step 1029 in the method as illustrated in FIG. 6, and step 1030 in the method as illustrated in FIG. 7; and implementing the functions of the modules 301 to 302 as illustrated in FIG. 8, the modules 401 to 403 as illustrated in FIG. 9, the module 302 and the sub-modules 3021 to 3024 as illustrated in FIG. 10.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-volatile computer-readable storage medium, wherein the computer readable storage medium stores computer-executable instructions, which, when being executed by at least one processor, for example, the processor 11 as illustrated in FIG. 11, cause the at least one processor to perform the role switching method according to any of the above method embodiments, for example, performing steps 101 to 102 in the method as illustrated in FIG. 2, steps 201 to 203 in the method as illustrated in FIG. 3, steps 1021 to 1203 in the method as illustrated in FIG. 4, steps 1024 to 1028 in the method as illustrated in FIG. 5, step 1029 in the method as illustrated in FIG. 6, and step 1030 in the method as illustrated in FIG. 7; and implementing the functions of the modules 301 to 302 as illustrated in FIG. 8, the modules 401 to 403 as illustrated in FIG. 9, the module 302 and the sub-modules 3021 to 3024 as illustrated in FIG. 10.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A robot role switching method, comprising:
at a robot, the robot being capable of communicating with other robots within a predetermined range:
identifying other robots having the same appearance as the robot itself within the predetermined range; and
performing role exchange with the other robots having the same appearance as the robot itself within the predetermined range.

2. The method according to claim 1, wherein the performing role exchange with the other robots having the same appearance as the robot itself within the predetermined range comprises:
acquiring a voice command of a user;
determining, according to the voice command, whether the user mistakes the robot for someone else, and a robot which the user desires to call; and
if the user mistakes the robot for someone else, performing role exchange with the robot which the user desires to call, or interrogating the user whether to perform role exchange with the robot which the user desires to call.

3. The method according to claim 2, further comprising:
adding wake-up words of the other robots having the same appearance as the robot itself within the predetermined range into a predetermined wake-up word library; and
sharing real-time position information with the other robots having the same appearance as the robot itself within the predetermined range; and
the determining, according to the voice command, whether the user mistakes the robot for someone else, and the robot which the user desires to call comprises:
parsing out a wake-up word in the voice command according to the voice command of the user;
if the wake-up word in the voice command is different from a wake-up word of the robot but is the same as a wake-up word in the wake-up word library, acquiring real-time position information of a robot corresponding to the wake-up word in the voice command, identifying whether the real-time position information is within a predetermined position range, and determining that the user mistakes the robot for someone else if the real-time position information is not within the predetermined position range; and
determining, according to the wake-up word in the voice command, the robot which the user desires to call.

4. The method according to claim 1, wherein the performing role exchange with the other robots having the same appearance as the robot itself within the predetermined range comprises:
acquiring remaining usage days of the robot;
acquiring remaining usage days of the other robots having the same appearance as the robot itself within the predetermined range;
identifying minimum remaining usage days in the remaining usage days of all the robots prior to role exchange;
estimating minimum remaining usage days in the remaining usage days of all the robots upon role exchange between the robot and the robots having the same appearance as the robot within the predetermined range; and
if the minimum remaining usage days upon role exchange exceeds the minimum remaining usage days prior to role exchange by a predetermined threshold, performing role exchange with the other robots having the same appearance as the robot itself within the predetermined range.

5. The method according to claim 4, wherein the acquiring the remaining days of the robot comprises:
acquiring mechanical wear of each joint;
estimating a remaining usage degree of the joint according to the mechanical wear;
estimating a daily wear amount of the joint according to a working task;
estimating the remaining usage days of the joint according to the remaining usage degree and the daily wear amount of the joint; and
taking minimum remaining usage days in the remaining usage days of all the joints as the remaining usage days of the robot.

6. The method according to claim 1, wherein the performing role exchange with the other robots having the same appearance as the robot itself within the predetermined range comprises:
performing role exchange with the other robots having the same appearance as the robot itself within the predetermined range at an interval of a predetermined time period according to working task types or characters of the other robots.

7. The method according to claim 1, wherein the performing role exchange with the other robots having the same appearance as the robot itself within the predetermined range comprises:
   performing role exchange with the other robots having the same appearance as the robot itself within the predetermined range if it is identified that the robot is abnormal.

8. The method according to claim 7, wherein the performing role exchange with the other robots having the same appearance as the robot itself within the predetermined range if it is identified that the robot is abnormal comprises:
   performing role exchange with a robot whose working priority is lower that the robot itself in the other robots having the same appearance as the robot itself within the predetermined range.

9. The method according to claim 1, further comprising:
   defining a character of the robot itself, such that the character of the robot itself is different from those of the other robots having the same appearance as the robot itself within the predetermined range.

10. The method according to claim 1, wherein the role exchange comprises:
    exchange of wake-up words, exchange of characters, and exchange of working tasks.

11. A robot, comprising:
    at least one processor; and
    a memory communicably connected to the at least one processor: wherein
    the memory stores instructions executable by the at least one processor, wherein, the instructions, when being executed by the at least one processor, cause the at least one processor to perform the method as defined in claim 1.

12. A non transitory computer-readable storage medium, wherein the computer-readable storage medium stores computer-executable instructions, which, when being executed by a robot, cause the robot to perform the method as defined in claim 1.

* * * * *